(12) United States Patent
Shinohara et al.

(10) Patent No.: US 7,677,528 B2
(45) Date of Patent: Mar. 16, 2010

(54) CONTROLLER

(75) Inventors: Tsutomu Shinohara, Osaka (JP); Michio Yamaji, Osaka (JP)

(73) Assignee: Fujikin Incorporated, Osaka-shi (JP)

( * ) Notice: Subject to any disclaimer, the term of this patent is extended or adjusted under 35 U.S.C. 154(b) by 524 days.

(21) Appl. No.: 10/588,288

(22) PCT Filed: Oct. 29, 2004

(86) PCT No.: PCT/JP2004/016462

§ 371 (c)(1), (2), (4) Date: Aug. 4, 2006

(87) PCT Pub. No.: WO2005/111485

PCT Pub. Date: Nov. 24, 2005

(65) Prior Publication Data

US 2007/0120080 A1   May 31, 2007

(30) Foreign Application Priority Data

May 13, 2004   (JP) ............................. 2004-143649

(51) Int. Cl.
*F16K 31/12* (2006.01)
(52) U.S. Cl. .................. 251/58; 251/63.6; 74/110
(58) Field of Classification Search .......... 251/58, 251/63.6, 263, 331, 63.5, 63.4; 74/110, 516, 74/519, 569
See application file for complete search history.

(56) References Cited

U.S. PATENT DOCUMENTS

| | | | | |
|---|---|---|---|---|
| 5,215,286 A | * | 6/1993 | Kolenc | 251/58 |
| 5,253,671 A | * | 10/1993 | Kolenc | 137/315.05 |
| 5,556,072 A | * | 9/1996 | Itoi et al. | 251/58 |
| 6,138,712 A | * | 10/2000 | Hirose | 137/559 |
| 6,932,315 B2 | * | 8/2005 | Ejiri | 251/14 |
| 2003/0160202 A1 | * | 8/2003 | Boecking | 251/229 |

FOREIGN PATENT DOCUMENTS

| | | |
|---|---|---|
| JP | 63-289388 | 11/1988 |
| JP | 7-19369 | 1/1995 |
| JP | 2784446 | 8/1998 |
| JP | 11-344151 | 12/1999 |
| JP | 2000-120921 | 4/2000 |
| JP | 3309052 | 7/2002 |
| JP | 3338972 | 10/2002 |

* cited by examiner

*Primary Examiner*—John K Fristoe, Jr.
*Assistant Examiner*—Marina Tietjen
(74) *Attorney, Agent, or Firm*—Kratz, Quintos & Hanson, LLP

(57) ABSTRACT

A controller comprises power transmitting means (11) for amplifying the force applied on the operating shaft (6) and transmitting to the valve rod (4); and a slow start means (12) for slowly moving the operating shaft (6) upward are arranged. The slow start means (12) includes a piston (8) that moves up and down with respect to the operating shaft (6); a pressure spring (44), arranged between a pressure spring receiver (43) arranged at the operating shaft (6) and the piston (8); a constantly opened communication passage (47) and an auxiliary communication passage (49) for communicating the pressure chamber (10) and the operation gas introducing chamber (27); a flow adjusting valve (48) provided in the constantly opened communication passage (47); and an open-close valve (50), arranged in the auxiliary communication passage (49), for opening the communication passage (49) when the piston (8) is at the lower most position and closing the communication passage (49) when raised from the lower most position by a predetermined distance and reaching the auxiliary communication shut off position.

2 Claims, 2 Drawing Sheets

CONTROLLER

TECHNICAL FIELD

The present invention relates to controllers, more specifically, to a controller suitable when using a high pressure fluid.

BACKGROUND ART

As a controller suitable when using a high pressure fluid, a controller is disclosed in patent article 1 (Japanese Laid-Open Patent Publication No. H07-139648) that includes a valve main body in which a fluid passage between a valve disc and a valve ring opens and closes with the up and down movement in a reciprocating manner of a valve rod; a casing fixed to an upper part of the valve main body; an operating shaft arranged at the upper section in the casing in a freely up and down movable manner; a driving means for moving the operating shaft up and down; a power transmitting means, arranged at the lower section in the casing, for amplifying the force applied on the operating shaft and transmitting to the valve rod; a biasing means for biasing the operating shaft downward; and a pressure chamber, formed between a piston arranged on the operating shaft and a partition plate arranged below the piston and fixed to the casing, for moving the operating shaft upward when the operation gas is introduced, wherein the valve rod moves upward as the operation gas is introduced into the pressure chamber, and the valve rod moves downward by the biasing force of the biasing means as the operation gas in the pressure chamber is discharged.

In the controller of patent article 1, the movement speed of the valve rod is not taken into consideration, and that in which the opening and closing operation is rapidly performed is preferred. However, with nitrogen trifluoride ($NF_3$) used in cleaning gas and the like of a semiconductor device, the flow rate thereof is required to be set equal to or lower than a certain value so that static electricity of the gas itself does not become the ignition source. A conventional controller is unable to support such needs.

The present invention aims to provide a controller for high pressure fluid that slowly moves the valve rod and that can be applied to gases such as nitrogen trifluoride that must be used while suppressing the flow rate.

DISCLOSURE OF THE INVENTION

The controller according to the present invention includes: a casing fixed to an upper part of a main body; a valve rod arranged projecting downward to the casing and moving up and down in a reciprocating manner; an operating shaft arranged in the casing in a freely up and down moving manner; a power transmitting means for amplifying a force applied on the operating shaft and transmitting to the valve rod; a biasing means for biasing the operating shaft downward; and a pressure chamber, formed between a piston arranged on the operating shaft and a partition plate arranged below the piston and fixed to the casing, for moving the operating shaft upward when an operation gas is introduced, wherein the controller further comprises a slow start means for slowly moving the valve rod upward, the slow start means including: the piston having an outer diameter smaller than an inner diameter of the casing and movable in up and down direction with respect to the operating shaft; a pressure spring, arranged between a spring receiver arranged at an upper part of the operating shaft and the piston, for applying an elastic force corresponding to an amount of up and down movement of the piston on the spring receiver and the piston; a diaphragm, arranged between an outer peripheral edge of the piston and the upper casing, for partitioning the pressure chamber and a space on an upper side of the piston; an operation gas introducing chamber arranged below the partition plate; a constantly opened communication passage, formed in the partition plate, for communicating the pressure chamber and the operation gas introducing chamber; a flow adjusting valve for adjusting a flow of the operation gas introduced into the constantly opened communication passage; an auxiliary communication passage, formed in the partition plate, for communicating the pressure chamber and the operation gas introducing chamber; and an open-close valve, arranged in the auxiliary communication passage, for opening the communication passage when the piston is at the lower most position and closing the communication passage when the piston is raised from the position by a predetermined distance and reaching an auxiliary communication shut off position.

The flow adjusting valve may be a needle valve including a valve main body with a fluid passage having one end formed in the partition plate and communicating to the constantly opened communication passage and the other end communicating to the operation gas introducing chamber; and a valve rod including a needle portion inserted to the fluid passage of the valve main body. The needle valve is capable of adjusting a gap between the needle portion and the fluid passage by screwing the valve rod with respect to the valve main body, and thus the flow of the operation gas is set at satisfactory precision.

The open-close valve is configured by a moving body inserted in an up and down movable manner into the auxiliary communication passage formed in the partition plate in a form of a perpendicular pass through hole and forming an operation gas passing gap with the peripheral surface of the passage, a coil spring serving as a biasing means for biasing the moving body upward, and a sealing member for closing the lower end opening of the auxiliary communication passage when the moving body is moved upward by the biasing means; wherein the sealing member is positioned at the opening position when the upper end face of the moving body is pressed against the lower surface of the piston, and the auxiliary communication passage is closed as the sealing member contacts the peripheral edge of the lower end opening of the auxiliary communicating passage by the upward force of the coil spring when the piston is moved upward.

In a state before the operation gas is introduced, that is, when the operating shaft is held at the lowermost position by the biasing means, the piston is moved downward by the downward biasing force of the pressure spring, and is stopped (lowermost position) when contacting the partition plate or the fixed member fixed to the partition plate. The size of the downward force acting on the piston is set to a predetermined value by changing the initial position of the spring receiver and adjusting the length of the pressure spring at the lowermost position of the operating shaft. When the piston is at the lowermost position, the open-close valve opens the auxiliary communicating passage as the moving body is pressed downward against the lower surface of the piston. Thus, the operation gas is introduced to the pressure chamber from both the constantly opened communicating passage and the auxiliary communicating passage.

When the operation gas is introduced into the pressure chamber via the operation gas introducing chamber, the internal pressure of the pressure chamber increases, and the piston moves upward where the force acting on the lower surface of the piston from the pressure chamber becomes larger than the biasing force of the pressure spring. Since the piston is not integrated with the operating shaft but is relatively movable with respect to the same, the piston rises first, and as the piston rises by the increase in the upward force from the pressure chamber, the pressure spring compresses, whereby the upper end of the piston and the lower end of the spring receiver contact and the spring receiver moves upward and the operating shaft moves upward integrally therewith.

With increase in the introducing amount of the operation gas, the piston rises from the lower most position to the upper most position (position corresponding to the upper most position of the operating shaft) through the auxiliary communication passage shut off position. Here, the movement is relatively rapid up to the auxiliary communication passage shut off position due to the operation gas from both the constantly opened communication passage and the auxiliary communication passage, but is relatively slow after the auxiliary communication passage shut off position as the auxiliary communication passage is shut off and only the operation gas from the constantly opened communication passage is provided. The flow of the operation gas from the constantly opened communication passage is controlled by the flow adjusting valve, so that the piston that has passed the auxiliary communication passage shut off position moves upward at an extremely slow speed.

Power transmission from the operating shaft to the valve rod rapidly starts after the introduction of the operation gas, and becomes a slow start by appropriately setting the auxiliary communicating passage shut off position and the positional relationship at where the upper end of the piston and the lower end of the spring receiver contact.

Preferably, a male threaded portion is formed at an upper end of the operating shaft, a female threaded portion for screw fitting to the male threaded portion is formed at an inner periphery of the spring receiver, the spring receiver being screw fit to the operating shaft, supported to the casing in a non-rotatable and up and down movable manner, the elastic force of the pressure spring is made adjustable by the spring receiver moving up and down when the operating shaft is rotated. Thus, setting of an appropriate operation condition is facilitated by adjusting the elastic force of the pressure spring, and further, the increase in the number of components therefor is suppressed.

Preferably, the power transmitting means includes: a first conical roller receiving member extending perpendicularly downward from a lower end of the operating shaft; a second roller receiving member arranged at an upper end of the valve rod; a pair of roller supporting bodies arranged symmetrically with respect to an axis of the first roller receiving member between both roller receiving members; a pair of rolling rollers supported at an upper part of each roller supporting body in a freely rotating manner and contacted to a tapered surface of the first roller receiving member; and a pair of presser rollers supported at a lower part of each roller supporting body in a freely rotating manner and contacted to an upward roller receiving surface of the second roller receiving member, wherein each roller supporting body is supported at the casing so as to move pivotally with an axis shifted towards the axis of the first roller receiving member with respect to the axis of the presser roller, and the biasing means for biasing the operating shaft downward is a double winded compression coil spring and received between an upper surface of the first roller receiving member and the partition plate. Thus, the slow start means may be added without degrading the function of the power transmitting means suitable in using the high pressure fluid.

According to the controller of the present invention, a power transmitting means for amplifying the force applied on the operating shaft and transmitting to the valve rod, and a slow start means for slowly moving the valve rod upward are arranged, and thus the pushing force is increased and becomes suitable when using the high pressure gas, and the flow of the high pressure gas is reduced (slow flow rate) by slowly moving the valve rod.

BEST MODE FOR CARRYING OUT THE INVENTION

The embodiment of the present invention will now be described with reference to the drawings. In the following description, up and down, as well as left and right of FIG. 1 are respectively referred to as up and down and left and right.

Figure 1:
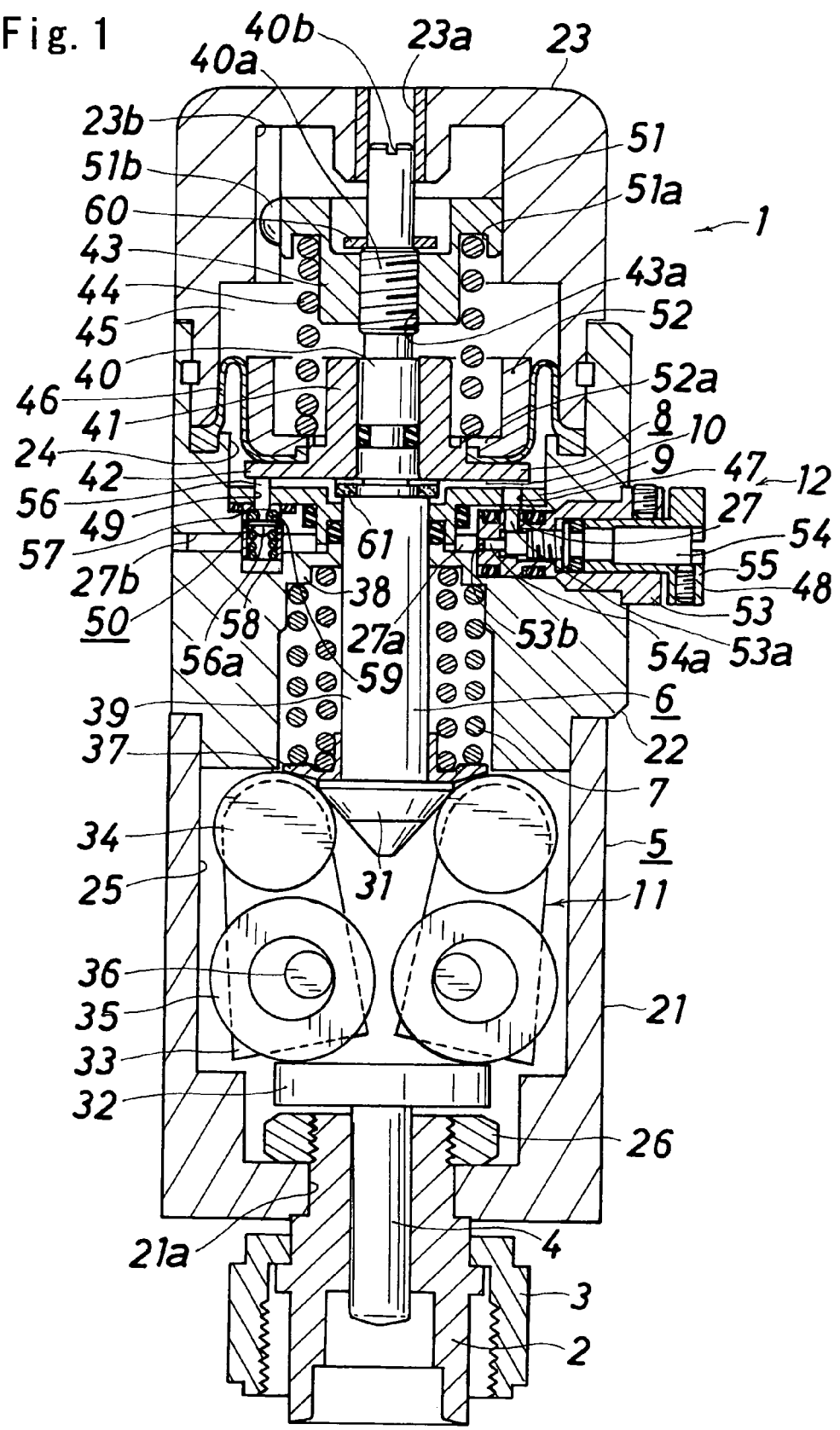
FIG. 1 is a longitudinal cross sectional view showing a first embodiment of a controller according to the present invention.
Figure 2:
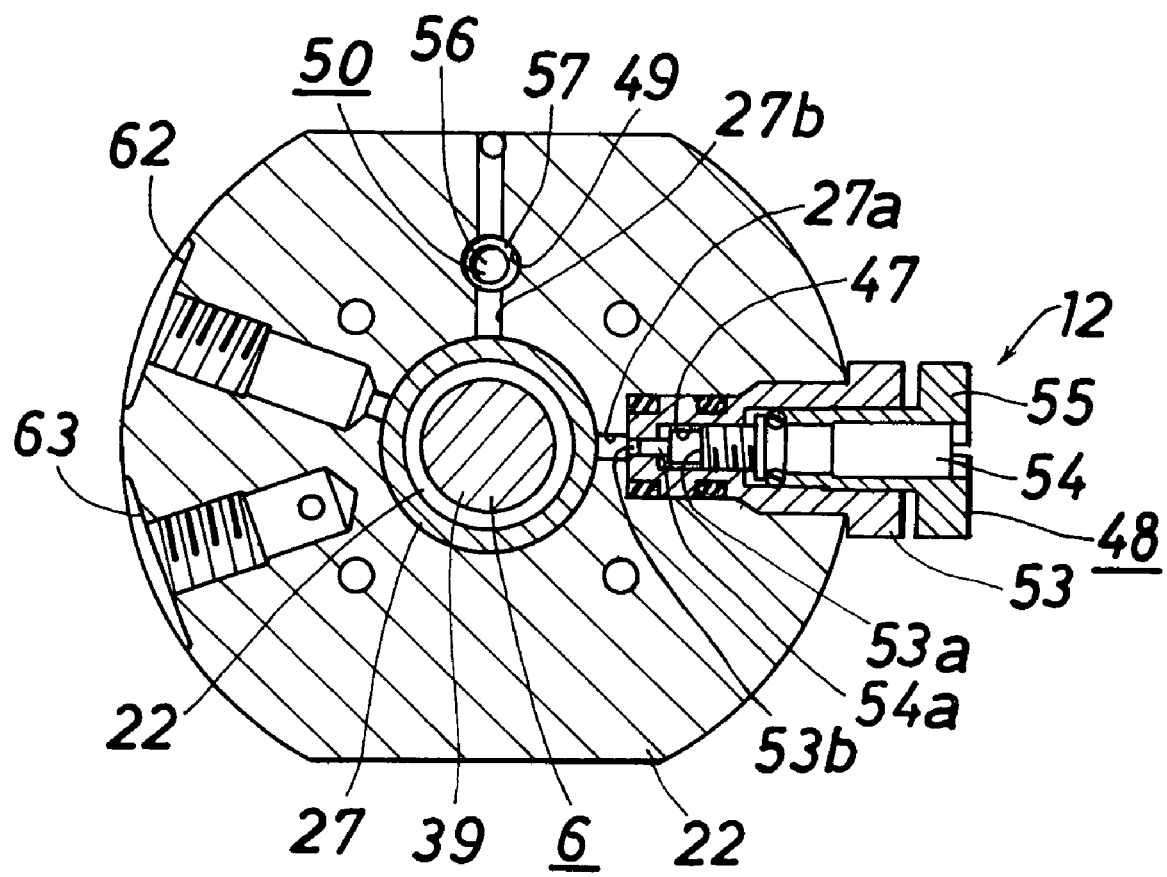
FIG. 2 is a transverse view of the same controller.

As shown in FIGS. 1 and 2, the controller (1) includes a cylindrical bonnet (2) attached by a cap nut (3) to a valve main body (not shown) formed with a fluid passage; a valve rod (4) that is inserted into the bonnet (2) and that moves up and down in a reciprocating manner; a casing (5) fixed to the upper end of the bonnet (2); an operating shaft (6) arranged in the casing (5) in a freely up and down moving manner; a biasing means (7) for biasing the operating shaft (6) downward; a pressure chamber (10), formed between the piston (8) arranged at the operating shaft (6) and a partition plate (9) arranged below the piston and fixed to the casing, for moving the operating shaft (6) upward when the operation gas is introduced; a power transmitting means (11) arranged at the lower section in the casing (5) for amplifying the force applied on the operating shaft (6) and transmitting to the valve rod (4); and a slow start means (12) for slowly moving the operating shaft (6) upward.

The controller (1) has a diaphragm (valve disc) arranged at the lower part (inner part) of the bonnet (2) by way of a member such as a diaphragm pusher, and the valve main body attached at the lower end of the bonnet (2), so that the fluid passage of the valve main body opens and closes with the up and down movement in a reciprocating manner of the valve rod (4).

The casing (5) is configured by a lower casing (21), an upper casing (22) fixed to the upper end of the lower casing, and a casing cap (23) fixed to the upper casing (22). The inner peripheral surface shape of the lower casing (21) has square horizontal cross section, and the inner peripheral surface shape of the upper casing (22) and the casing cap (23) has circular horizontal cross section. The lower casing (21) and the lower part of the upper casing (22) form a power transmitting device accommodating chamber (25), and the upper casing (22) and the casing cap (23) form a cylinder chamber (24) having a circular horizontal cross section. The lower casing (21) has a bottom wall formed with a bonnet inserting hole (21a) at the center, the upper end of the bonnet (2) is inserted into the bonnet inserting hole (21a), and a lock nut (26) is screw fit to the male threaded portion arranged at the upper end of the bonnet (2) to fix the bonnet (2) to the lower casing (21).

The partition plate (9) has an outer peripheral edge thereof fitted into and fixed to an upper part of the upper casing (22). An operation gas introducing chamber (27) is formed below the partition plate (9).

As shown in FIG. 2, an operation gas introducing port (62) is communicated to the operation gas introducing chamber (27), and the operation gas in the pressure chamber (10) is discharged from a purge port (63) arranged at a position shifted in the circumferential direction at the same height as the operation gas introducing port (62).

The power transmitting means (11) includes a first conical roller receiving member (31) extending perpendicularly downward from the lower end of the operating shaft (6); a second roller receiving means (32) arranged at the upper end of the valve rod (4); a pair of roller supporting bodies (33) arranged symmetrically with respect to the axis of the first roller receiving member (31) between both roller receiving members (31) (32); a pair of rolling rollers (34) supported at the upper part of each roller supporting body (33) in a freely rotating manner and contacted to the tapered surface of the first roller receiving member (31); a pair of presser rollers (35) supported at the lower part of each roller supporting body (33) in a freely rotating manner and contacted to the upward roller receiving surface of the second roller receiving member (32); and an eccentric shaft (36) integrally arranged at both end faces of the supporting shaft of the presser roller (35); where each roller supporting body (33) is supported at the lower casing (21) so as to move pivotally with the axis of the eccentric shaft (36) shifted towards the axis of the first roller receiving member (31) with respect to the axis of the presser roller (35).

When the front and back roller supporting bodies (33) move pivotally, the axis of the presser roller (35) rotates with the axis of the eccentric shaft (36), whereby the distance to the contacting point between the axis of the presser roller (35) and the second roller receiving member (32) changes and the force of the presser roller (35) to push the second roller receiving member (32) changes. The operating shaft (6) is biased downward by the elastic force of a compression spring (7) serving as the biasing means, where the front and back rolling rollers (34) are positioned in a direction of separating from each other and the front and back presser rollers (35) are positioned in a direction of approaching each other when the operation gas is not introduced. The elastic force of the pressure coil spring (7) is transmitted to the second roller receiving member (32) via the front and back rolling rollers (34), the front and back roller supporting bodies (33), and the front and back presser rollers (35), and the valve rod (4) is thereby pushed downward. The force applied on the second roller receiving member (32) allows the force applied to the operating shaft (6) to be amplified and transmitted at an arbitrary amplification ratio to the valve rod (4) by setting the tapered angle of the first roller receiving member (31), the distance between the axis of the eccentric shaft (36) and the axis of the rolling roller, and the horizontal distance between the axis of the presser roller and the axis of the eccentric shaft (36) at appropriate values.

The compression coil spring (7) serving as the operating shaft biasing means is a cylindrical coil spring that is internally and externally double winded, which double winded coil spring (7) is received between the lower double coil spring receiver (37) arranged at the upper surface of the first roller receiving member (31) and the upper double coil spring receiver (38) arranged at the middle of the upper casing (22). The lower double coil spring receiver (37) is configured by a cylindrical part fitted to the lower end of the operating shaft (6) and a flange part having the inner peripheral edge received at the upper surface of the first roller receiving member (31) and having an angle formed with the cylindrical part at an acute angle. The upper part spring receiver (38) is a step-form inward flange part integrally arranged at the middle of the upper casing (22), whereby the axis of the double coil spring (7) and the axis of the operating shaft (6) are coincided, and the operating shaft (6) is pushed with a strong force in the direction of the axis.

The operating shaft (6) includes a large diameter portion (39) with the first roller receiving member (31) at the lower end, and a small diameter portion (40) extending continuously from the upper end of the large diameter portion (39). The upper end of the small diameter portion (40) is inserted in an up and down movable manner into a pass through hole (23a) formed at the center of the casing cap (23).

The piston (8) is configured by a cylinder part (41) and a lower end flange part (42), and has the outer diameter of the lower end flange part (42) made smaller than the inner diameter of the upper casing (22), and the cylindrical part (41) fitted to the lower part of the small diameter portion (40) of the operating shaft (6) in an up and down movable manner instead of being fixed to the operating shaft (6). The downward movement of the piston (8) is regulated as the lower surface thereof contacts a seal ring (61) provided at the upper end of the large diameter portion (39) of the operating shaft (6).

The slow start means (12) includes the piston (8) that moves up and down with respect to the operating shaft (6); a pressure spring (44), arranged between a pressure spring receiver (43) at the upper part of the small diameter portion (40) of the operating shaft (6) and the piston (8), for applying the elastic force corresponding to the amount of up and down movement of the piston (8) on the pressure spring receiver (43) and the piston (8); a diaphragm (46), arranged between the outer peripheral edge of the lower end flange part (42) of the piston (8) and the upper casing (22), for partitioning the pressure chamber (10) and the space (45) on the upper side of the piston (8); an operation gas introducing chamber (27) arranged below the partition plate (9); a constantly opened communication passage (47), formed in the partition plate (9), for communicating the pressure chamber (10) and the operation gas introducing chamber (27); a flow adjusting valve (48) for adjusting the flow of the operation gas introduced into the constantly opened communication passage (47); an auxiliary communication passage (49), formed in the partition plate (9), for communicating the pressure chamber (10) and the operation gas introducing chamber (27); and an open-close valve (50), arranged in the auxiliary communication passage (49), for opening the communication passage (49) when the piston (8) is at the lower most position and closing the communication passage (49) when raised from the above position by a predetermined distance and reaching the auxiliary communication shut off position.

The pressure spring receiver (43) has a cylindrical shape including a flange part (51) at the upper end, includes in the inner periphery a threaded portion (43a) that is screw fitted to the male threaded portion (40a) arranged at the upper part of the small diameter portion (40) of the operating shaft (6), and integrally moves up and down with the operating shaft (6). A projection (51b) that projects in the radial direction is formed at the flange part (51) of the spring receiver (43), which projection is fitted into the guide groove (23b) formed extending in the up and down direction in the inner periphery of the casing cap (23), so that the spring receiver (43) of when the operating shaft (6) is turned is movable in the up and down direction but is non-rotatable with respect to the operating shaft (6). A stopper ring (60) is fitted to the upper end of the male threaded portion (40a) of the operating shaft (6), whereby the upward movement of the spring receiver (43) with respect to the operating shaft (6) is regulated.

The pressure spring (44) is a compression coil spring, which upper end is received by an annular concave part (51a) formed at the lower surface of the flange part (51), and which lower end is received at the inward flange part (52a) of the cylindrical diaphragm presser (52) provided at the upper surface of the flange part (42) of the piston (8).

A groove (40b) for fitting the screw driver is formed at the upper end face of the operating shaft (6). When the operating shaft (6) is turned, the spring receiver (43) that is movable in the up and down direction but non-rotatable with respect to the operating shaft (6) moves up and down with respect to the operating shaft (6) to adjust the elastic force of the pressure spring (44).

The diaphragm (46) has an annular cross sectional shape that is convex upwards, which inner peripheral edge is sandwiched by the inward flange part (52a) of the diaphragm presser (52) and the upper surface of the outer peripheral edge of the flange part (42) of the piston (8), and which outer peripheral edge is sandwiched between the step of the upper casing (22) and the lower end face of the peripheral wall of the casing cap (23).

The constantly opened communication passage (47) and the auxiliary communication passage (49) formed in the partition plate (9) are positioned on the circumference of the same radius, and the operation gas introducing chamber (27) has an annular shape communicating to both communication passages (47) (49). A constantly opened communication passage opening passage (27a) extending in the radius direction through the position corresponding to the constantly opened communication passage (47), and an auxiliary communication passage opening passage (27b) extending in the radius direction through the position corresponding to the auxiliary communication passage (49) communicate to the operation gas introducing chamber (27).

The flow adjusting valve (48) is a needle valve including a valve main body (53) inserted to a radial inserting hole formed in the peripheral wall of the upper casing (22), a valve rod (54) that includes a needle portion (54a) and that is screw fit to the female threaded portion arranged at the inner periphery of the valve main body (53), and a handle (55) for screw driving the valve rod (54) with respect to the valve main body (53).

An inlet passage (53b) communicating to the radial inner side portion of the constantly opened communication passage opening passage (27a) communicating to the annular operation gas introducing chamber (27) and an outlet passage (53a) communicating to the constantly opened communication passage (47) of the partition plate (9) are formed in the valve main body (53) of the flow amount adjusting valve (48), and the needle portion (54a) is inserted into the inlet passage (53b). When the handle (55) is rotated, the gap between the slightly tapered needle portion (54a) and the inlet passage (53b) changes, and the flow of the operation gas flowing to the constantly opened communication passage (47) can be set at satisfactory precision.

The open-close valve (50) is arranged at a bottomed hole for open-close valve arrangement in the up and down direction arranged at the upper casing (22), and is configured by a moving body (56) that is inserted into the auxiliary communication passage (49) formed in the partition plate (9) in an up and down movable manner and that forms an operation gas passing gap (57) with the peripheral surface of the passage (49); a coil spring (biasing means) (58) for biasing the moving body (56) upward; and a sealing member (59) for closing the lower end opening of the auxiliary communication passage (49) when the moving body (56) is moved upward by the biasing means (58).

The moving body (56) is a columnar shape and includes a flange part (56a) at the lower end. The coil spring (58) is held between the lower surface of the flange part (56a) and the bottom surface of the bottomed hole for open-close valve arrangement, and the sealing member (59) is an O-ring held at the upper surface of the flange part (56a). In the state shown in FIG. 1, the moving body (56) is pushed downward with the upper end face contacting the lower surface of the piston (8) positioned below, and accompanied therewith, the sealing member (59) is positioned at the opened position below. Thus, when the piston (8) moves upward from such state, the sealing member (59) contacts the peripheral edge of the lower end opening of the auxiliary communication passage (49) by the upward force of the coil spring (58), thereby closing the auxiliary communication passage (49). The position of the piston (8) at this point is the auxiliary communication passage shut off position.

According to this controller (1), when the operation gas is introduced from the operation pressure introducing port (62), the operation gas flows into the operation gas introducing chamber (27), and passes through both the constantly opened communication passage (47) and the auxiliary communication passage (49) and into the pressure chamber (10). Therefore, the pressure in the pressure chamber (10) rapidly rises even if the flow of the flow adjusting valve (48) provided at the constantly opened communication passage (47) is narrowed. The piston (8) is moved upward when the force acting on the lower surface of the piston (8) from the pressure chamber (10) becomes larger than the biasing force of the pressure spring (44). Since the piston (8) and the operating shaft (6) are not integral but are relatively movable, the piston (8) rises first, and the pressure spring (44) compresses as the piston (8) rises, whereby the upper end face of the piston (8) contacts the lower end face of the spring receiver (43), and the operating shaft (6) integrated with the spring receiver (43) moves upward.

With increase in the introducing amount of the operation gas, the piston (8) rises from the lower most position to the upper most position (position corresponding to the upper most position of the operating shaft (6)) through the auxiliary communication passage shut off position at where the auxiliary communication passage (49) is closed. Here, the movement is relatively rapid up to the auxiliary communication passage shut off position due to the operation gas from both the constantly opened communication passage (47) and the auxiliary communication passage (49), but is relatively slow after the auxiliary communication passage shut off position as the auxiliary communication passage (49) is shut off and only the operation gas from the constantly opened communication passage (47) is provided. The flow of the operation gas from the constantly opened communication passage (47) is controlled by the flow adjusting valve (48), so that the piston (8) that has passed the auxiliary communication passage shut off position moves upward at an extremely slow speed. With the movement of the piston (8), the pressure spring receiver (43) moves upward, and the operating shaft (6) screw fit to the pressure spring receiver (43) moves upward. As the operating shaft (6) moves upward by a predetermined distance, the force acting on the valve rod (4) via the power transmitting means (11) from the operating shaft (6) is released, and the valve disc arranged at the fluid passage of the main body is opened by the high pressure fluid, and the high pressure fluid is sent to the required device. As the piston (8) moves at an extremely slow speed, the upward movement of the operating shaft (6) becomes slow and as a result, the flow rate of the high pressure fluid also becomes slow. Thus, when the force acting on the valve rod (4) is released, the high pressure fluid having the property of flowing at rapid flow rate can be supplied to a reaction chamber at a speed less than or equal to a predetermined flow rate.

INDUSTRIAL APPLICABILITY

The controller according to the present invention allows slow opening and closing operation, and thus is applicable to gas that must be used while suppressing the flow speed, and the availability of the controller for high pressure fluid is extended.

The invention claimed is:

1. A controller comprising:
a casing fixed to an upper part of a main body;
a valve rod arranged projecting downward from the casing and moving up and down in a reciprocating manner;
an operating shaft arranged in the casing in a freely up and down moving manner;
a power transmitting means for amplifying a force applied on the operating shaft and transmitting to the valve rod;
a biasing means for biasing the operating shaft downward; and
a pressure chamber, formed between a piston arranged on the operating shaft and a partition plate arranged below the piston and fixed to the casing, for moving the operating shaft upward when an operation gas is introduced, wherein
the controller further comprises a slow start means for slowly moving the valve rod upward, the slow start means including:
the piston having an outer diameter smaller than an inner diameter of the casing and movable in up and down direction with respect to the operating shaft;
a pressure spring, arranged between a spring receiver arranged at an upper part of the operating shaft and the piston, for applying an elastic force corresponding to an amount of up and down movement of the piston on the spring receiver and the piston;
a diaphragm arranged between an outer peripheral edge of the piston and the upper casing, for partitioning the pressure chamber and a space on an upper side of the piston;
an operation gas introducing chamber arranged below the partition plate;
a constantly opened communication passage, formed in the partition plate, for communicating the pressure chamber and the operation gas introducing chamber;
a flow adjusting valve for adjusting a flow of the operation gas introduced into the constantly opened communication passage;
an auxiliary communication passage, formed in the partition plate, for communicating the pressure chamber and the operation gas introducing chamber; and
an open-close valve, arranged in the auxiliary communication passage, for opening the auxiliary communication passage when the piston is at the lower most posit on and for closing the auxiliary communication passage when the piston is raised from the lower most position by a predetermined distance and has reached an auxiliary communication shut off position, wherein
a male threaded portion is formed on the operating shaft at an upper end of the operating shaft, a female threaded portion for direct threaded engagement to the male threaded portion is formed at an inner periphery of the spring receiver, the spring receiver being screw fit to the operating shaft, supported to the casing in a non-rotatable and up and down movable manner, and the elastic force of the pressure spring being adjustable by the spring receiver moving up and down when the operating shaft is rotated.

2. The controller according to claim 1, wherein
the power transmitting means includes:
a first conical roller receiving member extending perpendicularly downward from a lower end of the operating shaft;
a second roller receiving means arranged at an upper end of the valve rod;
a pair of roller supporting bodies arranged symmetrically with respect to an axis of the first roller receiving member between both roller receiving members;
a pair of rolling rollers supported at an upper part of each roller supporting body in a freely rotating manner and contacted to a tapered surface of the first roller receiving member; and
a pair of presser rollers supported at a lower part of each roller supporting body in a freely rotating manner and contacted to an upward roller receiving surface of the second roller receiving member, wherein
each roller supporting body is supported at the casing so as to move pivotally with an axis shifted towards the axis of the first roller receiving member with respect to the axis of the presser roller, and
the biasing means for biasing the operating shaft downward is a double winded compression coil spring and received between an upper surface of the first roller receiving member and the partition plate.

* * * * *